US012293646B2

(12) United States Patent
Abbas et al.

(10) Patent No.: US 12,293,646 B2
(45) Date of Patent: May 6, 2025

(54) MONITORING AND ADVANCED ASSET RECOVERY DEVICES AND SYSTEMS

(71) Applicants: Brian A. Abbas, Yuma, AZ (US); Jason A. Abbas, Walbridge, OH (US)

(72) Inventors: Brian A. Abbas, Yuma, AZ (US); Jason A. Abbas, Walbridge, OH (US)

( * ) Notice: Subject to any disclaimer, the term of this patent is extended or adjusted under 35 U.S.C. 154(b) by 160 days.

(21) Appl. No.: 18/142,543

(22) Filed: May 2, 2023

(65) Prior Publication Data

US 2024/0078885 A1 Mar. 7, 2024

Related U.S. Application Data

(60) Provisional application No. 63/337,570, filed on May 2, 2022.

(51) Int. Cl.
*G08B 13/24* (2006.01)

(52) U.S. Cl.
CPC ................................ *G08B 13/2468* (2013.01)

(58) Field of Classification Search
None
See application file for complete search history.

(56) References Cited

U.S. PATENT DOCUMENTS

| | | | | | |
|---|---|---|---|---|---|
| 8,643,468 | B1 * | 2/2014 | Peabody | G07C 9/00944 340/5.73 |
| 2007/0234643 | A1 * | 10/2007 | Siegal | E06B 7/32 49/169 |
| 2008/0198021 | A1 * | 8/2008 | Flood | B30B 9/3042 220/200 |
| 2018/0186531 | A1 * | 7/2018 | McBride | B65D 55/14 |
| 2020/0054128 | A1 * | 2/2020 | Gilbert | B62B 3/004 |
| 2020/0293990 | A1 * | 9/2020 | Mak | G06K 7/10366 |
| 2020/0312067 | A1 * | 10/2020 | Fisher | E05B 65/5246 |
| 2021/0241552 | A1 * | 8/2021 | Jonely | G07C 9/00944 |
| 2022/0351558 | A1 * | 11/2022 | VanDeusen | G07C 9/00182 |
| 2023/0036924 | A1 * | 2/2023 | Syed | G07C 9/00182 |

* cited by examiner

*Primary Examiner* — John F Mortell
(74) *Attorney, Agent, or Firm* — James A. Sheridan; Sheridan Law, LLC

(57) ABSTRACT

There are disclosed monitoring and advanced asset recovery devices and systems ("MAARS"). In an embodiment, a MAARS device includes a housing, a circuit board fixedly attached to the housing, affixed to the circuit board is a processor/microcontroller/minicomputer, electronic components to support the microcontroller, sensor modules, wireless modules, a power source, and an antenna. Each of the microcontroller, electronic components, sensor modules, wireless modules, and power source form an integrated circuit and are in communication with one another. The monitoring and advanced asset recovery device is configured to be installed inside a container where the device will measure and monitor a number of variables to determine the status, condition, and location of the container. Other embodiments are also disclosed.

20 Claims, 9 Drawing Sheets

MONITORING AND ADVANCED ASSET RECOVERY DEVICES AND SYSTEMS

REFERENCE TO PENDING PRIOR PATENT APPLICATION

This application claims the benefit under 35 U.S.C. 119 (e) of U.S. Provisional Patent Application No. 63/337,570, filed May 2, 2022 by Brian Abdulghani Abbas for "MONITORING AND ADVANCED ASSET RECOVERY DEVICES AND SYSTEMS," which patent application is hereby incorporated herein by reference.

FIELD OF THE INVENTION

The present invention generally relates to monitoring and advanced asset recovery devices and systems.

BACKGROUND

It is estimated that hundreds of thousands of guns are stolen each year, the vast majority of which are stolen from private gun owners. Many gun owners try to protect their guns and other valuables by installing a safe in their homes or storage units and putting their guns and valuables inside the safe. Safes, however, are not immune to theft. There are countless news articles from the US reporting safes being stolen during burglaries. Once a safe has been stolen, they are taken to a secure location, where burglars can then open the safe and steal the contents. There are numerous ways for safe owners to keep their safes secure, ways such as bolting the safe to the ground, having safes with more advanced locking mechanisms, or building furniture around the safe to disguise it. All these may help keep the safe secure from a burglar, however, even with such safety precautions, safes can be and do get stolen. Stolen safes and their contents are rarely recovered, as there is no notification system to alert owners when their safe is tempered with, nor its whereabouts. Safe owners generally do not have any redress to find their guns and valuables besides filing police reports and insurance claims. Once the safe has been stolen, the owner has no way of knowing where the safe is and the burglar can use any number of ways to force open the safe, all of which may take time depending on the quality of the safe and the thickness of the metal that comprises the safe. During the time burglars attempt to break into a safe, they are vulnerable and the contents of the safe are secure, however, the whereabouts of the safe is unknown. A need, therefore, exists for a device, system, and method to monitor certain numbers of variables to determine the location and security of the safe and to direct proper authorities to the location for recovery.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is provided a monitoring and advanced asset recovery device comprising a housing; a circuit board attached to the housing; a computer, electronic components to support the computer, sensor modules, wireless modules, a power source, and an antenna in operable connection to the circuit board; and an antenna mount configurable to position the antenna at a location operable to emit a signal from a container, with the location configured to allow the antenna to emit the signal without causing the signal to pass through a wall of the container, and with the container providing a tamper resistant configuration for the antenna and the housing disposed therein, wherein the housing is configured for installation inside the container to measure and monitor a number of variables to determine the status and location of the container. In another embodiment, there is provided a method of monitoring and advanced asset recovery of a container and its contents, the method comprising obtaining a monitoring and advanced asset recovery device comprising: a housing; a circuit board attached to the housing; a computer, electronic components to support the computer, sensor modules, wireless modules, a power source, and an antenna in operable connection to the circuit board; and an antenna mount configurable to position the antenna at a location operable to emit a signal from a container, with the location configured to allow the antenna to emit the signal without causing the signal to pass through a wall of the container, and with the container providing a tamper resistant configuration for the antenna and the housing disposed therein, wherein the housing is configured for installation inside the container to measure and monitor a number of variables to determine the status and location of the container; installing the monitoring and advanced asset recovery device inside the container; monitoring status and location of the container; determining if a significant change in status and location of the container has been detected; and alerting at least one of an end-user and a law-enforcement authority if significant changes are detected.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

The following detailed description and appended drawings describe and illustrate various example embodiments of monitoring and asset recovery devices and systems. The description and illustration of these examples are provided to enable one skilled in the art to make and use monitoring and asset recovery devices and systems. They are not intended to limit the scope of the claims in any manner.

Figure 1:
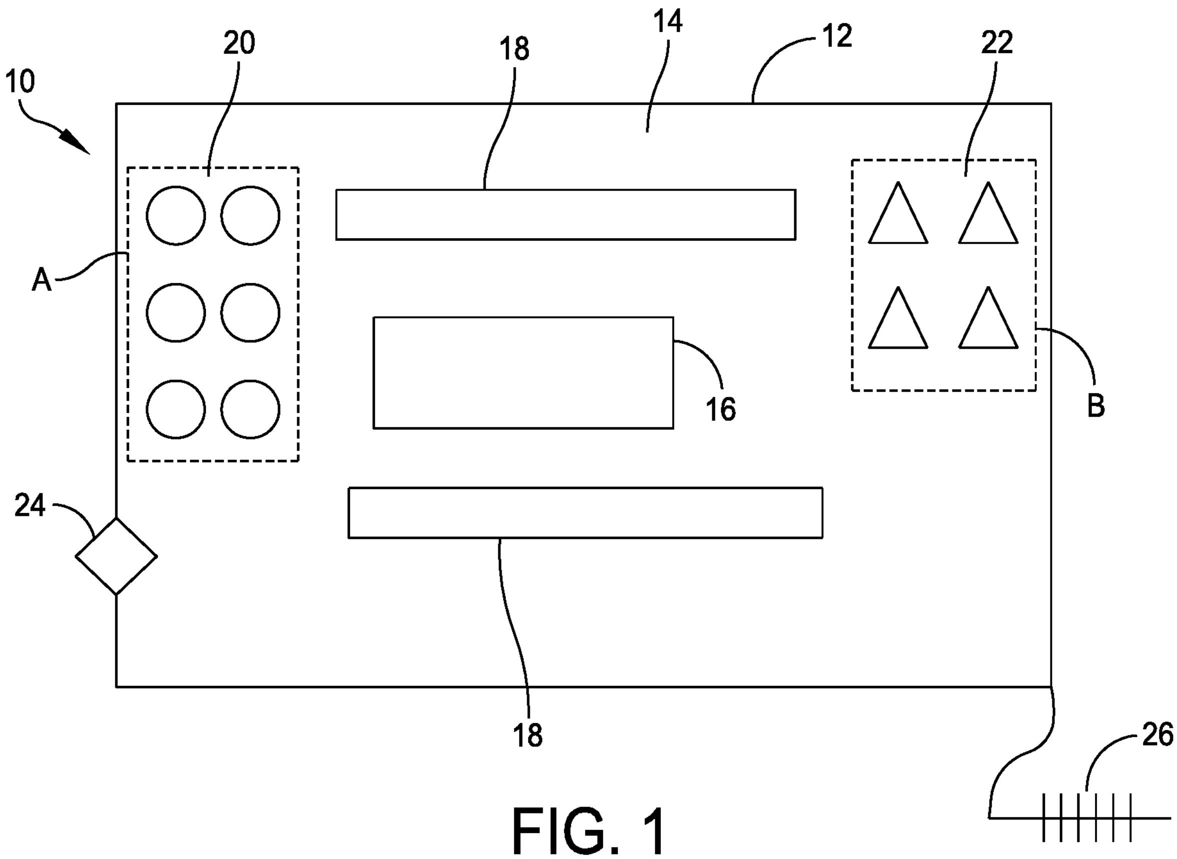
FIG. 1 is a general layout of a monitoring and asset advanced recovery device according to an embodiment.
Figure 2:
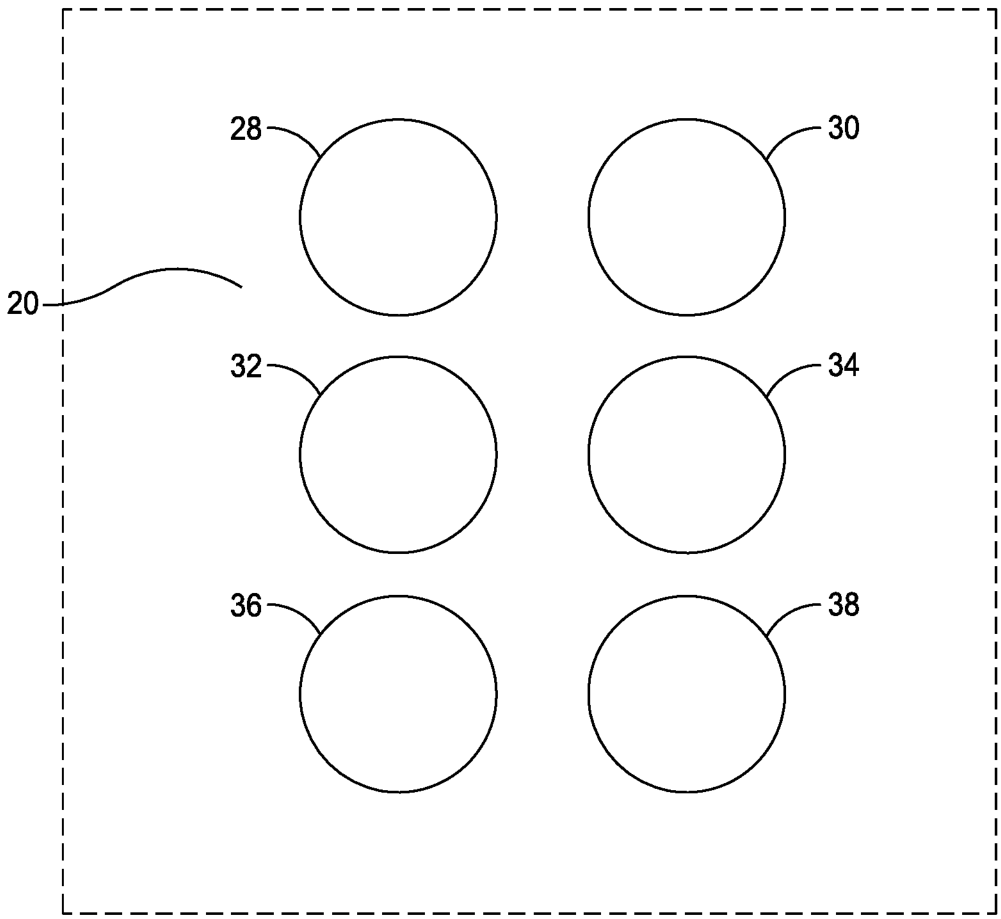
FIG. 2 is a magnified perspective view of area A indicated in FIG. 1.
Figure 3:
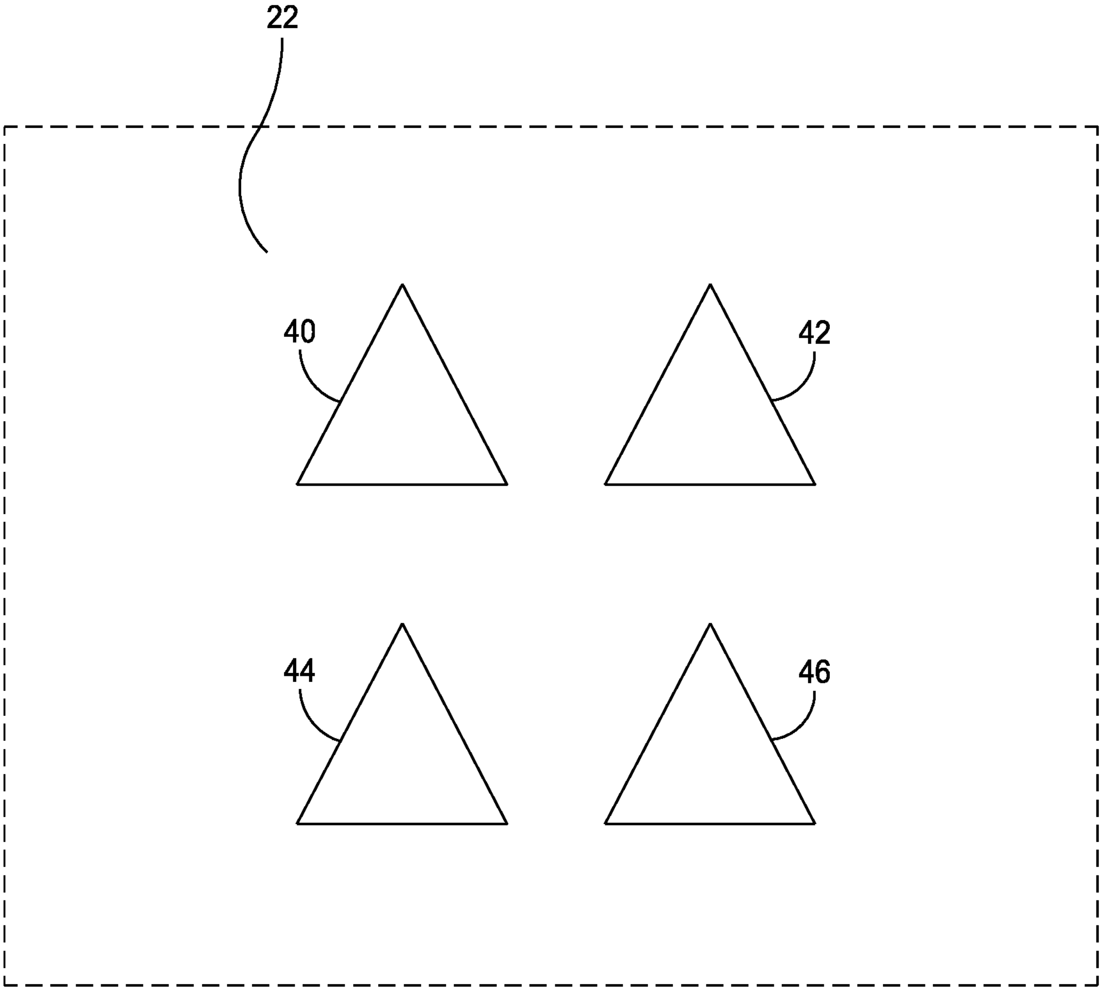
FIG. 3 is a magnified perspective view of area B indicated in FIG. 1.

FIGS. 1, 2, and 3 illustrate an example embodiment of a monitoring and advanced asset recovery device 10. The monitoring and advanced asset recovery device 10 comprises a housing 12 and a circuit board 14 fixedly attached to the housing 12. Affixed to the circuit board 14 is a processor or microcontroller 16, electronic components 18 to support the microcontroller 16, sensor modules 20, wireless modules 22, a power source 24, and an antenna 26. Each of the microcontroller 16, electronic components 18, sensor modules 20, wireless modules 22, and power source 24 form an integrated circuit and are in communication with one another. The monitoring and advanced asset recovery device 10 is configured to be installed inside a container where the device 10 will measure and monitor a number of variables to determine the status and location of the container.

Each of the sensor modules 20 and the wireless modules 22 is customizable as per end-user need. For the purposes of this embodiment, the sensor modules 20 comprises a multi-axis accelerometer 28, touch-capacitive sensor 30, touch-pressure sensor 32, infrared motion sensor 34, magnetic field sensor 36, and temperature and humidity sensor 38, while the wireless modules 22 comprises a cellular connectivity module 40, WLAN connectivity module 42, PAN (such as Bluetooth) connectivity module 44, and a GNSS module 46. The presence of these sensor modules 20 and wireless modules 22 will enable the monitoring of multiple parameters of the monitoring and advanced asset recovery device 10. The monitoring and advanced asset recovery device 10 is configured to be inserted inside a container (not shown) such that it behaves as one of the contents of the container. The inside of the container can then be monitored based on certain parameters and certain measurements of various variables can be obtained. If the measurements taken lie outside of a pre-determined threshold, the microcontroller 16 will send a wireless signal to an end-user alerting them of the status of the contents of the container and the location of the device. Optionally, the microcontroller 16 can send an emergency wireless signal to proper authorities alerting them to the status of the contents of the container and the location of the device. Proper authorities may include police, fire department, emergency response teams, security personnel, or any other person or department that is authorized to retrieve missing or stolen goods.

In the present embodiment, the monitoring and advanced asset recovery device 10 has been described as comprising a microcontroller 16 that acts as a minicomputer of the monitoring and advanced asset recovery device 10. The microcontroller 16 controls the input and output of the monitoring and advanced asset recovery device 10 and ensures fluid communication between all the sensor modules 20 and wireless modules 22. In a different embodiment, however, a device can have any type of electronic component that would function as a minicomputer and skilled artisans will be able to select the proper component to include on a device based on various considerations. For example, a device may include a microcontroller, microprocessor, Field Programmable Gate Arrays (FPGAs), Application-specific integrated circuit (ASIC), computers generally, CPUs, or any other component to serve as a minicomputer on a device.

Additionally, while in the present embodiment the monitoring and advanced asset recovery device 10 has been described as comprising a single microcontroller 16, a device can include any number of minicomputers and skilled artisans will be able to select the number and combination of minicomputers to include in a device based on various considerations. For example, a device may include one, more than one, two, a plurality, three, more than three, or any other number of minicomputers. In addition, a device may include any combination of minicomputers and can include one or more of the following, microcontroller, microprocessor, Field Programmable Gate Arrays (FPGAs), Application-specific integrated circuit (ASIC), and any other minicomputer type device.

The accelerometer 28 will be used to measure the acceleration that takes place in relation to any adequate coordinate system, one example is 3-dimensional cartesian coordinates. It can gauge the changes in speed of the monitoring and advanced asset recovery device 10. The accelerometer 28 sends and receives data value signals from the microcontroller 16. The microcontroller 16 is configured to check the data values against a pre-determined threshold; if the data values exceed the threshold, such as if the device is tampered with or is moved, the microcontroller 16 will send a wireless signal to an end-user alerting them that the monitoring and advanced asset recovery device 10 has detected movement.

The monitoring and advanced asset recovery device 10 also comprises an antenna 26. The antenna can be either internal, i.e., located within the housing 12 attached to the circuit board 4, or external, i.e., located on the outside the housing 12. The antenna 26 is configured to receive and transmit signals to and from the wireless modules 22, by the microcontroller 16, and to and from associated wireless networks or an end-user directly. The antenna 26 is also configured to transmit and receive signals directly to and from proper authorities. The monitoring and advanced asset recovery device 10 may also comprise a separate antenna accessory (not shown) that can be used to increase, or boost, the signal strength of the monitoring and advanced asset recovery device 10. The antenna accessory comprises the antenna 26 connected to the monitoring and advanced asset recovery device 10 by a connecting medium such as USB port, and an affixing medium (not shown) such as magnet or adhesive to affix the antenna 26 to the container. The antennas 26 described in this application can take on any technological form and skilled artisans will be able to select an appropriate technological form for an antenna based on various considerations. Examples of acceptable technological forms for an antenna include loop, dipole, SAW, or any other form that may be considered suitable for a particular application.

The infrared motion sensor 34, which can be active, passive, or hybrid type, will be used to measure infrared light radiating from objects in its field of view. When the monitoring and advanced asset recovery device 10 is inserted inside a container (not shown), the infrared motion sensor 34 will measure the infrared light radiating from the walls of the container. Temperature and motion will also trigger this sensor. The infrared motion sensor 34 will also measure temperature changes and motion changes. The infrared motion sensor 34 sends these measurements as signals to the microcontroller 16. If these measurements exceed a certain threshold, such as if the distance between the monitoring and advanced asset recovery device 10 and one or more walls of the container changes, i.e. the container door is opened, the microcontroller 16 will send a signal to an end-user alerting them that the monitoring and advanced asset recovery device 10 has detected changes in the environment, i.e. changes to the status of the container and its contents have been detected.

The magnetic field sensor 36 will be used to detect changes in the magnetic field of a container (not shown) in which the monitoring and advanced asset recovery device 10 is to be inserted. This has applications in proximity sensing, positioning, and others. The microcontroller 16 is in communication with the magnetic field sensor 36, receiving measurements as signals from the magnetic field sensor 36. The microcontroller 16 is configured to check the measurements against a pre-determined threshold. If the measurements exceed the threshold, such as if one or more walls of the container is moved or removed, or if a door is opened, the microcontroller 16 will send a signal to an end-user alerting them that the monitoring and advanced asset recovery device 10 has detected changes in the environment, i.e., changes to the status of the container and its contents have been detected.

The temperature and humidity sensor 38 is configured to detect changes in the temperature and humidity of a container (not shown) in which the monitoring and advanced asset recovery device 10 is to be inserted. The microcontroller 16 is in communication with the temperature and humidity sensor 38, receiving temperature and humidity measurements from the inside of the container as signals from the temperature and humidity sensor 38. The microcontroller 16 is configured to check the measurements against a pre-determined threshold. If the measurements exceed the threshold, such as if one or more walls of the container is moved or removed or if a door is opened, the microcontroller 16 will send a signal to an end-user alerting them that the monitoring and advanced asset recovery device 10 has detected changes in the environment, i.e., changes to the status of the container and its contents have been detected.

The cellular connectivity module 40 is used to connect the monitoring and advanced asset recovery device 10 to a cellular network. The cellular connectivity module 40 can include or be substituted with any module that uses any land based, satellite based, or other data network system, such as LTE, 5G, satellite phone and data systems, or any others. The microcontroller 16 and cellular connectivity module 40 communicate with each other via data signals. The cellular connectivity module 40 provides internet connectivity to the microcontroller 16 when internet connectivity, via the WLAN connectivity module 42, is disrupted or unavailable. The cellular connectivity module 40 is also used to provide location data, via cellular location services based on cellular triangulation and/or other methods, if the GNSS module 46 should fail or is unable to obtain location information due to signal reception issues or other. Cellular connectivity also allows the monitoring and advanced asset recovery device 10 to send messages directly to an end-user.

The WLAN connectivity module 42 is used to connect the monitoring and advanced asset recovery device 10 to the internet via an internet connected WLAN network. The WLAN connectivity module 42 provides internet connectivity to the microcontroller 16 and connects the monitoring and advanced asset recovery device 10 to the internet.

If the microcontroller 16 detects a change in internet connectivity, such as losing WLAN connectivity or tampering of the device, the microcontroller 16 will send a signal to an end-user alerting them that the monitoring and advanced asset recovery device 10 has detected changes to the internet connectivity of the device.

The PAN connectivity module 44 is used to establish a secure PAN network connection between the monitoring and advanced asset recovery device 10, and the user interface application on an end user device. This is used to perform initial setup of the device, modify user preferences, update firmware, or other. The PAN connectivity module 44 and microcontroller 16 communicate via data signals.

The GNSS module 46 will be used to send and receive up-to-date location data to the microcontroller 16. The GNSS module 46 is configured to be in contact with the microcontroller 16 and send up-to-date GNSS coordinates of the monitoring and advanced asset recovery device 10. The GNSS module 46 can include, or be substituted with, any module that uses any land based, satellite based, or other data network system designed for tracking and locating. The microcontroller 16 is configured to receive the GNSS coordinates from the GNSS module 46 and to send the coordinates to a database or directly to the end user device, which can be accessed by the interface application on an end-user device. If the microcontroller 16 fails to receive a signal from the GNSS module 46, such as due to failure of the module or tampering of the device, the microcontroller 16, or supervising internet service, will send a signal to an end-user alerting them that the monitoring and advanced asset recovery device 10 has detected changes to the location of the device.

While the monitoring and advanced asset recovery device 10 has been described as having a certain combination of sensor modules 20 and wireless modules 22, a device can have any combination of sensor modules and wireless modules and skilled artisans will be able to select a suitable configuration for one or more sensors to be included on a device according to a particular embodiment based on various considerations. For example, a device can include or omit any combination of sensor modules, such as, multi-axis accelerometer, touch-capacitive sensor, touch-pressure sensor, infrared motion sensor, magnetic field sensor, temperature and humidity sensor, and any other sensor that can be used for a particular embodiment. Additionally, a device can include or omit any combination of wireless modules, such as, cellular connectivity module, WLAN connectivity module, PAN connectivity module, GNSS receiver module or any other satellite or land-based location system module, and any other wireless module that can be used for a particular embodiment. Additionally, a device can include additional sensors and wireless modules. Examples of additional sensors and wireless modules that can be included on a device include video cameras, cameras, pressure plates (used to sense when items are removed/replaced or the weight of items shifts), inventory control systems, smart racks (racks with sensors integrated to determine when items are replaced/removed), smart shelves (shelving units that have integrated sensors to determine when items are removed/replaced), RFID reader (to determine exactly which items have been removed from the storage container), wireless charger (used to charge wireless devices inside of the storage unit and the device itself), laser distance sensor, external antenna referred to earlier, external magnetic wireless charging unit, and any other sensor or wireless module that can be included to serve a particular purpose. Additionally, the sensor modules 20 and wireless modules 22 can be integrated into the monitoring and advanced asset recovery device 10 or can be located outside of the monitoring and advanced asset recovery device 10 and connect wirelessly or remotely to the monitoring and advanced asset recovery device 10. Also, the device can include environmental/air quality/gas sensor to detect atmospheric change in a container, for protecting assets in hermetically sealed containers.

Figure 4:
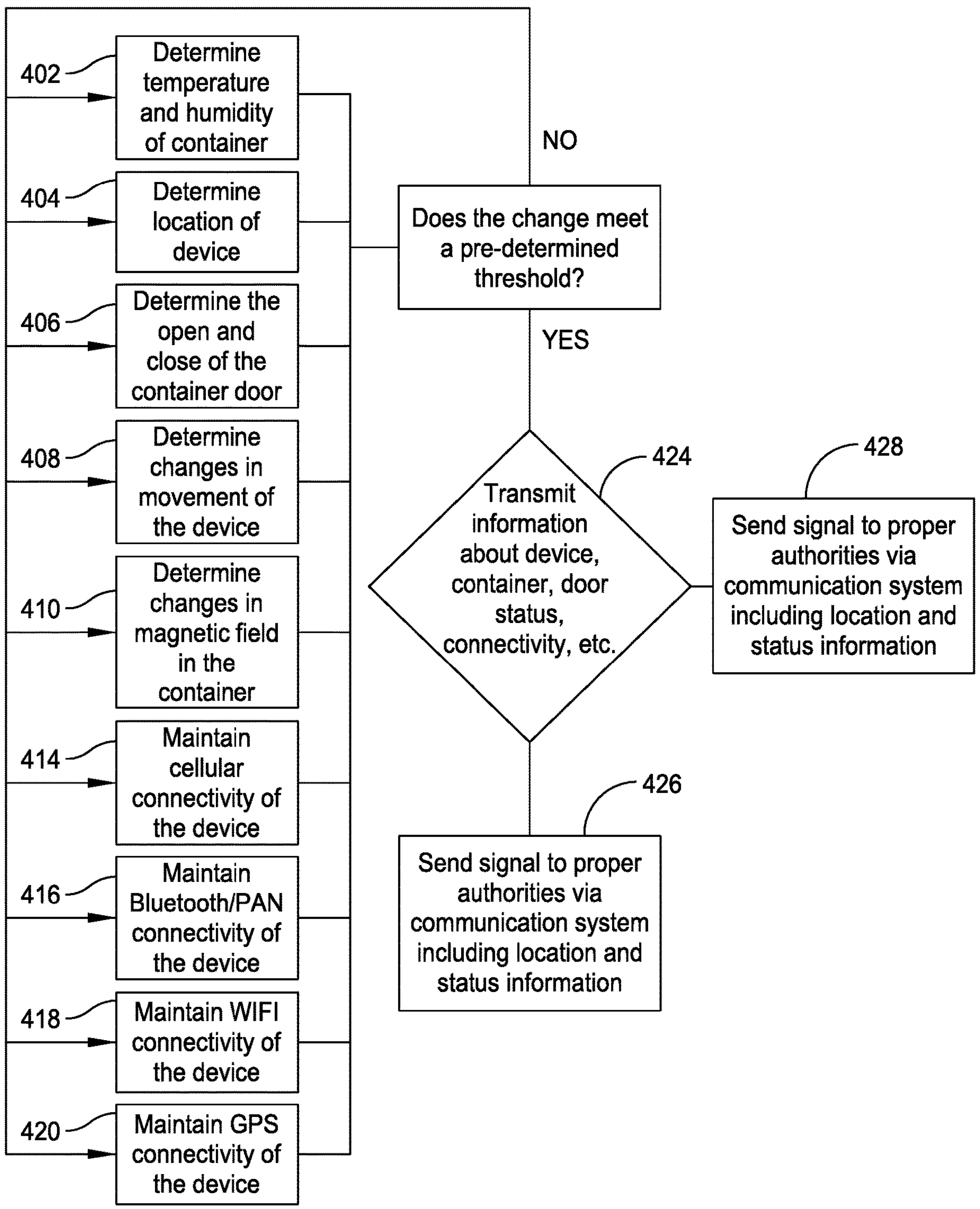
FIG. 4 is a flowchart that illustrates the process of signal transmittal the device of FIG. 1.

FIG. 4 is a flowchart illustrating the process of signal transmittal within the monitoring and advanced asset recovery device 10 of FIG. 1, as described above. Process 400 of microcontroller 16 comprises step 402 of determining the temperature and humidity of the inside of a container, step 404 determining the location of a device, step 406 determining the open and/or closing of the state of the container, step 408 determining the change in movement of a device, step 410 determining the change in magnetic field in a container, step 414 maintaining cellular connectivity of a device, step 416 maintaining PAN connectivity of a device, step 418 maintaining the WLAN connectivity of a device, step 420 maintaining the GNSS connectivity of a device, step 422 determining if any of the parameters meets a pre-determined threshold, step 424 transmitting information about a device, container, container walls, wireless connectivities, and other information, step 426 sending emergency signal to end-user via wireless modules that includes location data and status information of the inside of the container, and step 428 sending emergency signal to proper authorities via wireless modules that includes location data and status information of the inside of the container.

Step 402 comprises determining the temperature and humidity of the inside of a container. This can be accomplished by utilizing a device having a temperature and humidity sensor such as monitoring and advanced asset recovery device 10 and the temperature and humidity sensor 38 illustrated in FIG. 2, placing the device inside of a container having a moveable wall, port, door, hatch, or opening, transmitting data between the temperature and humidity sensor and the microcontroller regarding the temperature and humidity of the environment just outside the device located inside of said container, interpreting the data by the microcontroller to determine if the data lies within or outside a pre-determined threshold, sending wireless signals to an end-user about the status of the container and its contents.

Step 404 comprises determining the location of the device. Location can also be determined without GNSS Module by utilizing cellular data to triangulate its position based on cellular triangulation principles and practices. Determining the location of the device can be accomplished by utilizing a device having a GNSS module such as monitoring and advanced asset recovery device 10 and the GNSS module 46 illustrated in FIG. 3, placing the device inside of a container having a moveable wall, port, door, hatch, or opening, transmitting data between the GNSS module and the microcontroller regarding the up-to-date location data, interpreting the data by the microcontroller to determine if the data lies within or outside a pre-determined threshold, sending wireless signals to an end-user about the location of the device. This can also be determined without a GNSS module by utilizing cellular data to triangulate the device's position based on cellular triangulation principles and practices. The device or application can then determine if the data lies within or outside a pre-determined threshold, sending wireless signals to an end-user about the location of the device.

Step 406 comprises determining whether the moveable wall, port, door, hatch, or opening of the container is opened or closed. Step 406 can be accomplished in any number of ways. One possible way can be through the passive IR motion sensor detecting changes in thermal light, such as when the container is opened, or the presence of a person or persons. Another possible way can be through affixing a passive/active secondary sensor on the door of the container to measure the distance between the door and the device, and to determine whether a change in distance, corresponding to the opening or closing of the door, has been detected. Another possible way to detect whether the door of the container is open or close is to obtain a device, such as monitoring and advanced asset recovery device 10, having a laser distance measuring sensor, the sensor can measure the distance between the door of the container and the device. If a change in distance is detected, that would mean that the door of the container has been opened or closer. Additionally, a wireless pressure sensor or magnetic sensor can be affixed to a locking mechanism of the container or placed within a locking recess on the container to determine when the locking mechanism of the container has been locked or unlocked.

Step 408 comprises determining the change in movement of a device. This can be accomplished by utilizing a device having a multi-axis accelerometer such as monitoring and advanced asset recovery device 10 and the accelerometer 28 illustrated in FIG. 2, placing the device inside of a container having a moveable wall, port, door, hatch, or opening, transmitting data between the multi-axis accelerometer and the microcontroller regarding change in movement of the device, including vibration, interpreting the data by the microcontroller to determine if the data lies within or outside a pre-determined threshold, sending wireless signals to an end-user about the status of the container.

Step 410 comprises determining the change in magnetic field in a container. This can be accomplished by utilizing a device having a magnetic field sensor such as monitoring and advanced asset recovery device 10 and the magnetic field sensor 36 illustrated in FIG. 2, placing the device inside of a container having a moveable wall, port, door, hatch, or opening, transmitting data between the magnetic field sensor and the microcontroller regarding the magnetic field inside the container, interpreting the data by the microcontroller to determine if the data lies within or outside a pre-determined threshold, sending wireless signals to an end-user about the status of the container.

Step 414 comprises maintaining cellular connectivity of a device. This can be accomplished by utilizing a device having a cellular connectivity module such as monitoring and advanced asset recovery device 10 and the cellular connectivity module 40 illustrated in FIG. 3, placing the device inside of a container having a moveable wall, port, door, hatch, or opening, transmitting data between the cellular connectivity module and the microcontroller regarding connectivity status, interpreting the data by the microcontroller to determine if the data lies within or outside a pre-determined threshold, sending wireless signals to an end-user about the connectivity activity of the device.

Step 416 comprises maintaining PAN connectivity of a device. This can be accomplished by utilizing a device having a PAN connectivity module such as monitoring and advanced asset recovery device 10 and the PAN connectivity module 44 illustrated in FIG. 3, placing the device inside of a container having a moveable wall, port, door, hatch, or opening, transmitting data between the PAN connectivity module and the microcontroller regarding connectivity status, interpreting the data by the microcontroller to determine if the data lies within or outside a pre-determined threshold, sending wireless signals to an end-user about the connectivity of the device.

Step 418 comprises maintaining the WLAN connectivity of a device. This can be accomplished by utilizing a device having a WLAN connectivity module such as monitoring and advanced asset recovery device 10 and the WLAN connectivity module 42 illustrated in FIG. 3, placing the device inside of a container having a moveable wall, port, door, hatch, or opening, transmitting data between the WLAN connectivity module and the microcontroller regarding connectivity status, interpreting the data by the microcontroller to determine if the data lies within or outside a pre-determined threshold, sending wireless signals to an end-user about the connectivity of the device.

Step 420 comprises maintaining GNSS connectivity of a device. This can be accomplished by utilizing a device having a GNSS module such as monitoring and advanced asset recovery device 10 and the GNSS module 46 illustrated in FIG. 3, placing the device inside of a container having a moveable wall, port, door, hatch, or opening, transmitting data between the GNSS module and the microcontroller regarding location or connectivity status, interpreting the data by the microcontroller to determine if the data lies within or outside a pre-determined threshold, sending wireless signals to an end-user about the location of the device and its connectivity status.

Step 422 comprises the determination of whether any of the parameters meets a pre-determined threshold. Step 422 can be accomplished by using a microcontroller, such as microcontroller 16 illustrated in FIG. 1, to compare the data with pre-determined thresholds. If the data lies within the thresholds, steps 402, 404, 406, 408, 410, 414, 416, 418, 420, and 422 are repeated. If the data lies outside the thresholds, the process continues to step 424.

Step 424 comprises transmitting information about a device, container, container walls, wireless connectivities, and other information. This can be accomplished by utilizing a device having sensor modules and wireless modules, such as monitoring and advanced asset recovery device 10 and the sensor modules 20 and wireless modules 22 illustrated in FIG. 1, placing the device inside of a container having a moveable wall, port, door, hatch, or opening, transmitting data between the sensor and wireless modules and the microcontroller regarding the status of the container and its contents and container walls, the location of the device, the cellular, WLAN, and PAN connectivity of the device, and other information. This step can be accomplished before, after, or concurrently with any of steps 402, 404, 406, 408, 410, 414, 416, 418, 420, and 422 as described above.

Step 426 comprises sending an emergency signal to an end-user via wireless modules that includes location data and status information of the inside of the container. This step can be accomplished by activating the passive sensors 20 in FIGS. 1 and 2. This causes the microcontroller 16 to process the input from all the sensors and to determine whether the device's parameter thresholds have been exceeded. If the parameters are not exceeded, the microcontroller 16 will run an algorithm to determine the next course of action. If the parameters are exceeded, the microcontroller 16 will activate the wireless modules 22 to transmit data to an end-user via cellular network, WIFI network, and/or PAN network. Notifications can be sent directly to the end-user or, optionally, to a data-cloud platform which will send the notifications to the end-user. This step is optional and can be configured by the end-user depending on user preferences.

Step 428 is optional and comprises sending emergency signal to proper authorities via wireless modules that includes location data and status information of the inside of the container. The user can accomplish this step by first setting up parameters (either via PAN, cloud/internet, wired, or other user configuration interface) to determine when emergency signals are sent to the authorities. Once the pre-programmed parameters of the passive sensors 20 have been exceeded, as determined by the microcontroller 16 and algorithm, the microcontroller 16 will send constant notifications to the cloud, end-user, and proper authorities utilizing the wireless modules 22. The signals will continue to be sent until they are manually turned off by the end-user or proper authorities. This step is optional and can be omitted depending on whether an end-user wishes this step to be included in the process or omitted, depending on user preferences.

While process 400 is described as comprising steps 402, 404, 406, 408, 410, 414, 416, 418, and 420, a process can include any number of suitable steps and can include additional steps or omit certain steps and skilled artisans will be able to select which steps to include and which steps to omit on a process according to a particular embodiment. For example, a process may omit any of the following steps: the step of determining the temperature and humidity of the inside of a container, the step of determining the location of a device, the step of determining the open and/or closing of the state of the container, the step of determining the change in movement of a device, the step of determining the change in magnetic field in a container, the step of maintaining cellular connectivity of a device, the step of maintaining PAN connectivity of a device, the step of maintaining the WLAN connectivity of a device, or the step of maintaining the GNSS positioning signal reception of a device. Additionally, the process can include the any additional step that may be necessary to achieve a particular result. Additionally, skilled artisans may be able to design out certain components, utilizing sensor-less detection methods or algorithms, inference from existing data, or clever use of certain modules to perform multiple functions.

Figure 5:
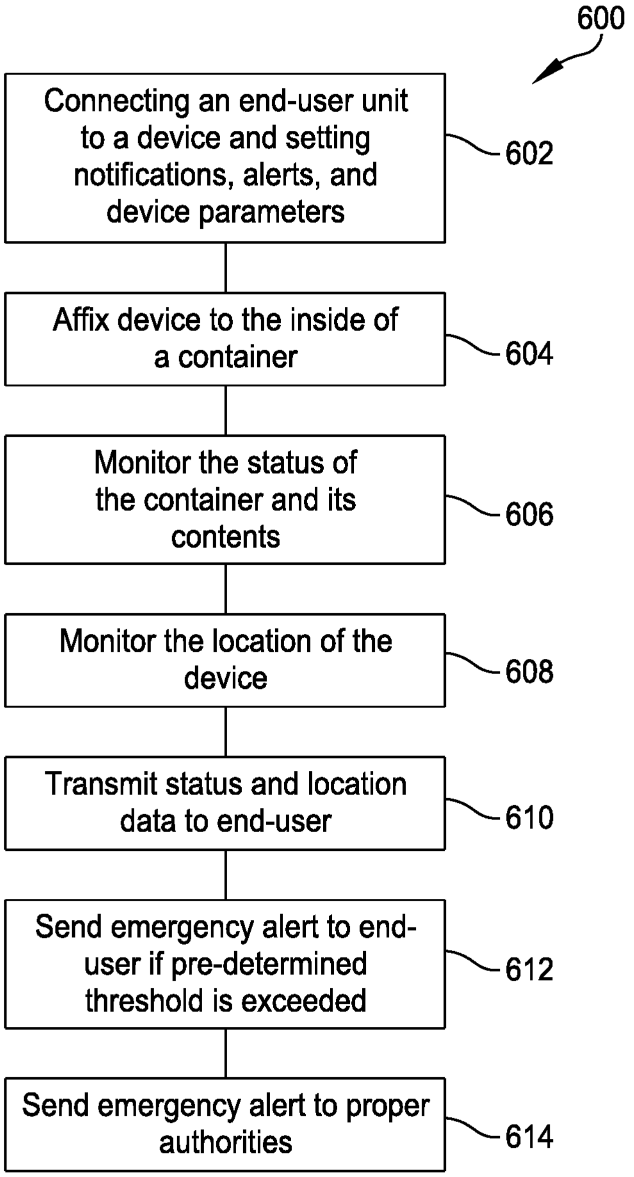
FIG. 5 is a flow diagram of a method of monitoring the status of a container and determining the location of said container.
Figure 6:
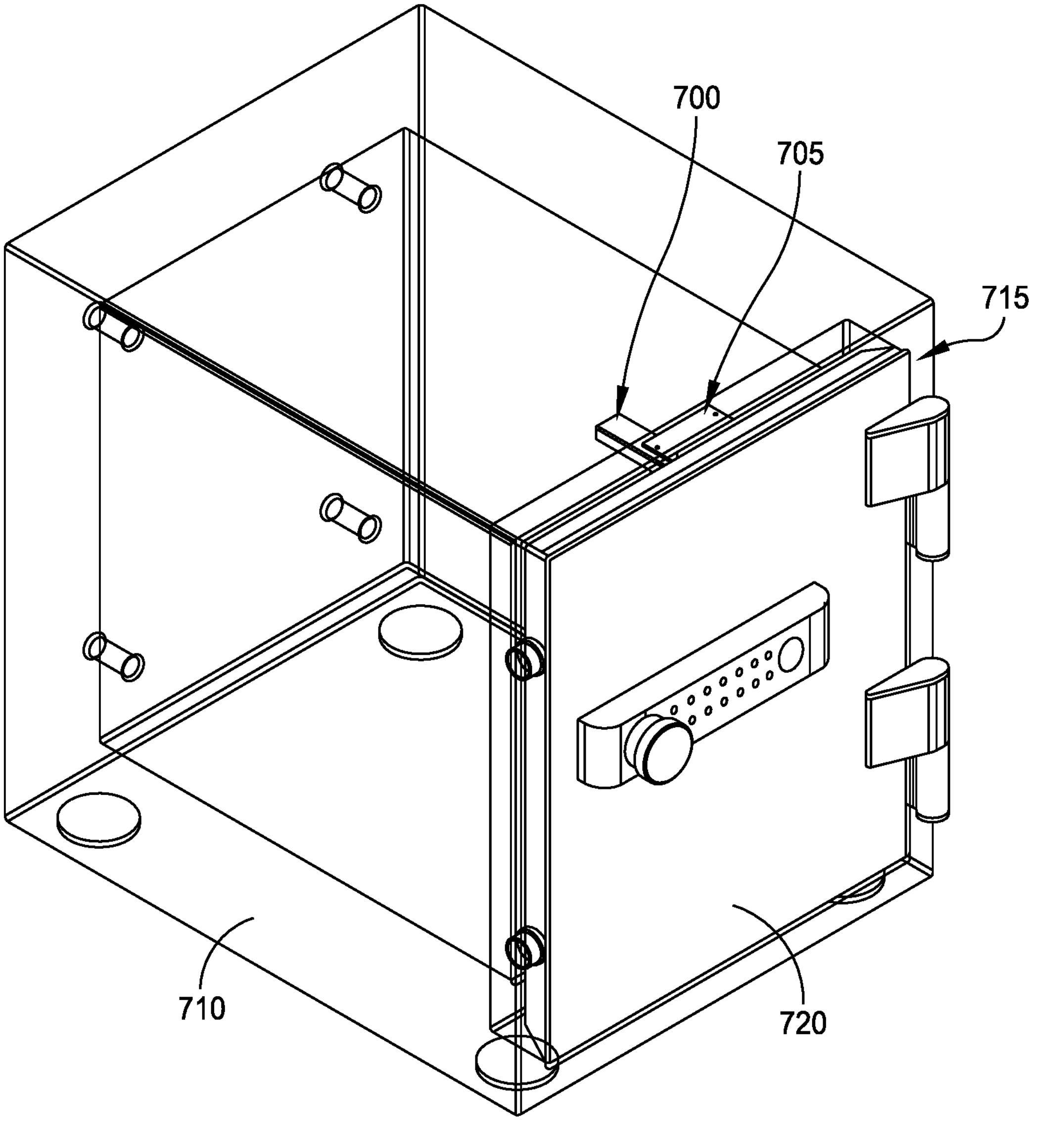
FIG. 6-9 are schematic views of an exemplary embodiment of a tamper resistant configuration of a monitoring and asset advanced recovery device and an antenna disposed within a container.
Figure 7:
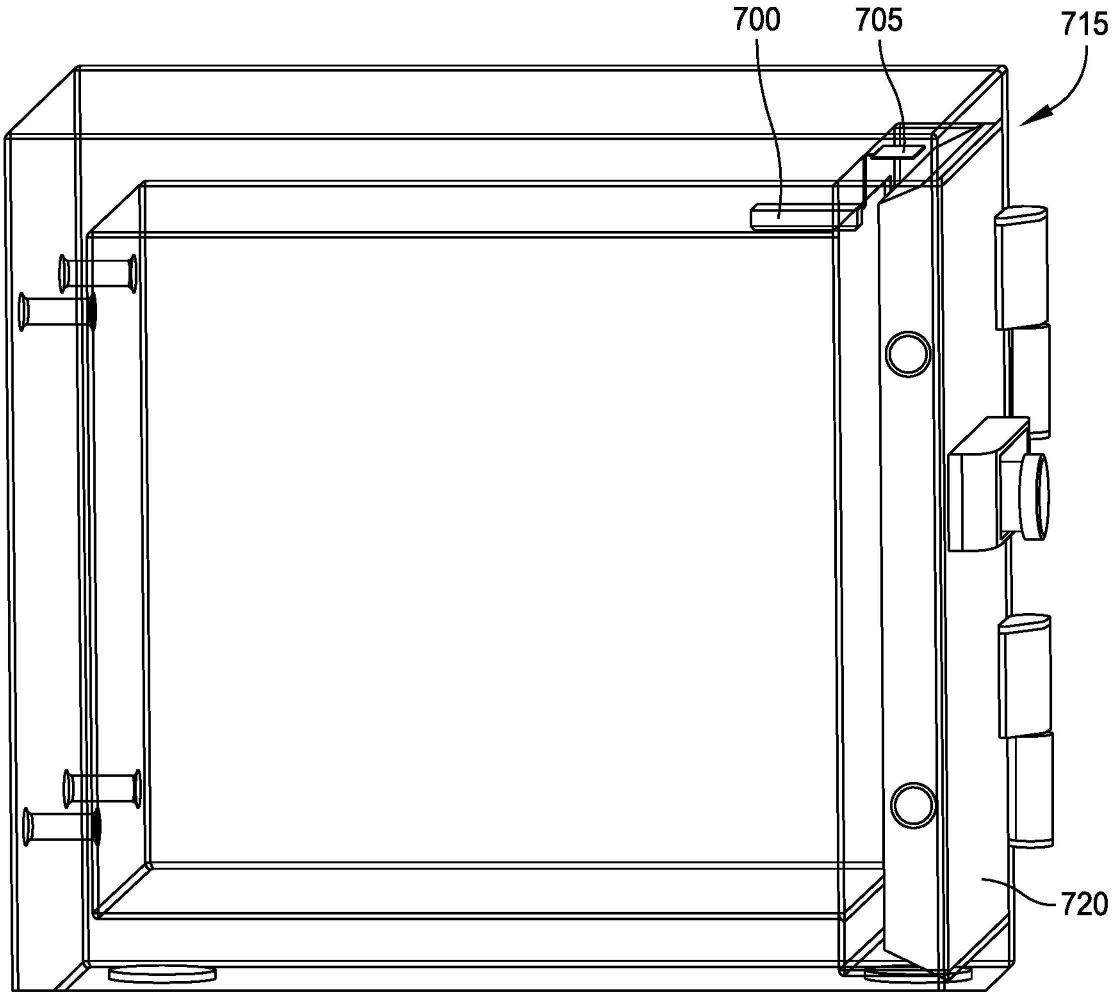
Figure 8:
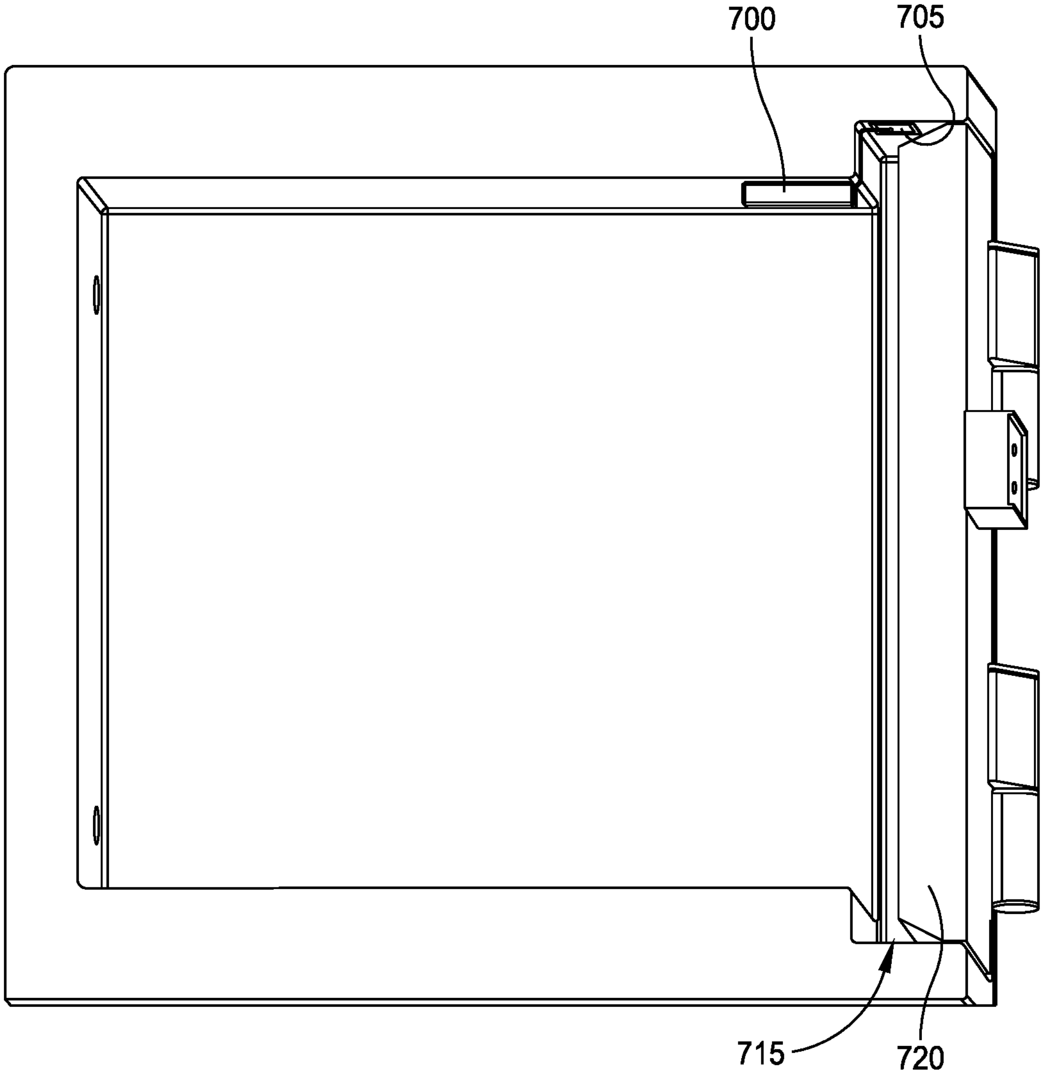
Figure 9:
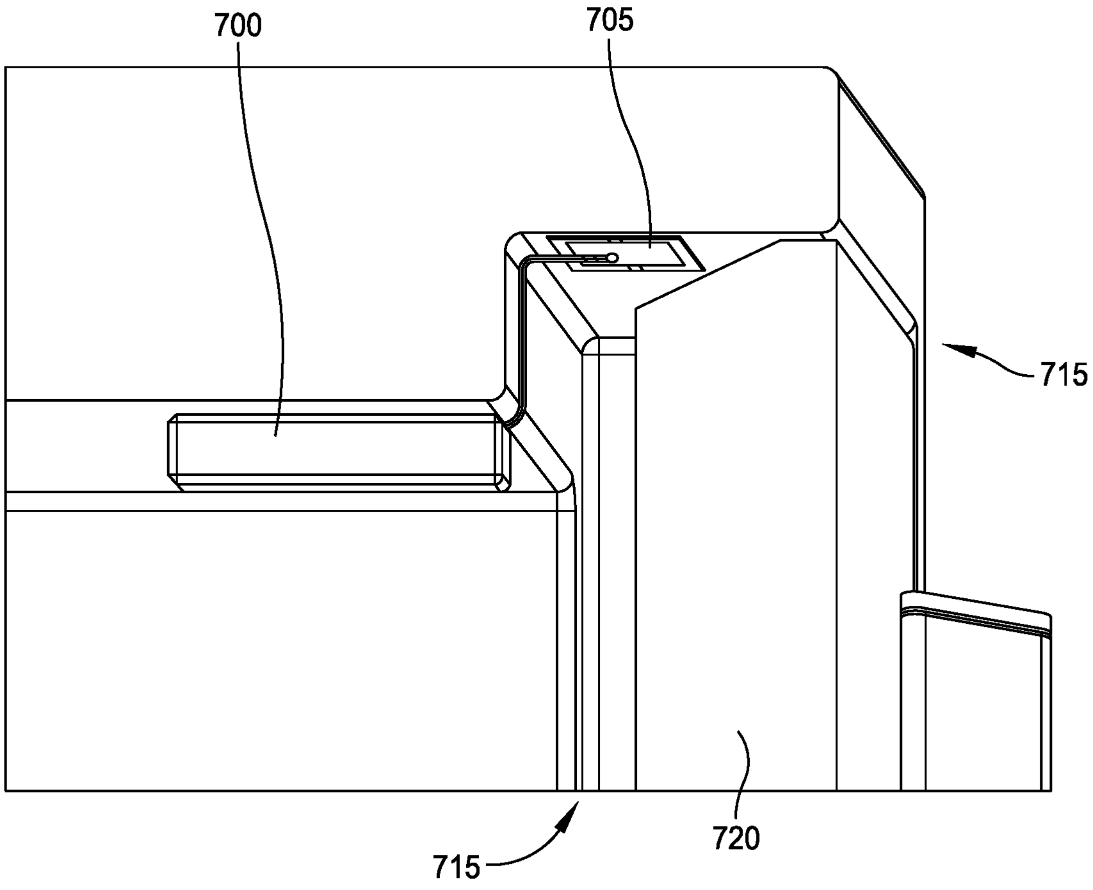

FIG. 5 is a flow diagram of a method of monitoring the status of the container and determining the location of the container. Method 600 comprises step 602 connecting an end-user unit to a device and setting notifications, alerts, and device parameters, step 604 affixing a device on the inside of a container, step 606 monitoring the status of the container and its contents, step 608 monitoring the location of the device, step 610 transmitting the status of the container and location of the device to an end-user and/or database for later user access, step 612 sending emergency alert to end-user if pre-determined thresholds are exceeded, and step 614 sending emergency alert to proper authorities if pre-determined thresholds are exceeded.

Step 602 comprises connecting an end-user unit to a device, such as monitoring and advanced asset recovery device 10 illustrated in FIG. 1 and described above, and setting notifications, alerts, and device parameters. This step can be accomplished by activating the PAN capabilities of the device, such as activating the BLE PAN connectivity module in FIGS. 1 and 3, and establishing a PAN connection between the device and the end-user unit, such as phone, tablet, computer, or other unit. The end-user can then use a pre-installed computer program to set up notifications, alerts, and device parameters.

Step 604 comprises affixing a device on the inside of a container. This can be accomplished by utilizing a device having a microcontroller, sensor modules, and wireless modules, such as, the monitoring and advanced asset recovery device 10 illustrated in FIG. 1 and described above, and affixing it to the inside of a container having a moveable wall, port, door, hatch, or opening. This can be accomplished by any number of means and an end-user will be able to select a means of affixing the device to the inside of a container. The affixation of the device to the inside of the container can be permanent or temporary, the device can be detachable or immovable. Furthermore, the device can be attached to the inside of a container in any number of ways, such as by fasteners, screws, glue, sticker, magnets, Velcro, or any other way that an end user might use to affix a device to the inside of a container. The device can also be placed anywhere inside of the container. It can be placed on a wall, door, shelf, floor, ceiling, or anywhere else inside of the container. The device can also be built into the container, integrated into the container, molded to the walls of the container, etc. Additionally, wires, ropes, strings, or any other material can be used to hang, dangle, or suspend the device within the container such that the device is not in contact with any of the walls, shelves, ceiling, or the body of the container.

In this embodiment, step 604 has been described as comprising affixing a device on the inside of a container. Another embodiment, however, can omit step 604. In such an embodiment, a device, such as monitoring and advanced asset recovery device 10 illustrated in FIGS. 1 thru 3, can be integrated into a container such that the device is a component of the container. In such an embodiment, the device functions in the same manner as monitoring and advanced asset recovery device 10 and it can be incorporated and placed anywhere within the container. For example, the device may be made a part of one or more walls or doors within the container such that the electric components, sensors, and modules are located throughout the container and are not all contained within a housing of the container.

The sensors 20 can be detached, i.e., wired or wireless, from the circuit board 14, and still have the same essential layout and functions. This device can be built into a door of a container and into a locking mechanism. If integrated into the door of a container and locking mechanisms, then the device can integrate a display, such as touchscreen or other, and keyless entry methods, such as RFID, biological entry, facial recognition, fingerprint, cellular, or other keyless and remote unlocking/entry methods, onto an outward face of a door of a container. This would also allow the container to keep track the opening and closing of the container door, as well as user information, and display/send their information to a controlling or responsible device. Having the device integrated into the locking mechanism will also allow users to see if the container's door locks are engaged or disengaged, and it gives a user the ability to remotely unlock the container.

Step 606 comprises monitoring the status of the container and its contents. This can be accomplished by utilizing a device having sensor modules, such as monitoring and advanced asset recovery device 10 and the sensor modules 20 illustrated in FIG. 1, placing the device inside of a container having a moveable wall, port, door, hatch, or opening, transmitting data between the sensor modules and the microcontroller regarding the status of the container, container walls, and other information.

Step 608 comprises monitoring the location of the device. This can be accomplished by utilizing a device having wireless modules, such as monitoring and advanced asset recovery device 10 and wireless modules 22 illustrated in FIG. 1, placing the device inside of a container having a moveable wall, port, door, hatch, or opening, transmitting data between the wireless modules and the microcontroller regarding the location of the device, cellular, WLAN, and PAN connectivity of the device, and other information.

Step 610 comprises transmitting the status of the container and its contents, location, and connectivities of the device to an end-user. This can be accomplished by utilizing a device having sensor modules and wireless modules, such as those in monitoring and advanced asset recovery device 10, sensor modules 20, and wireless modules 22 illustrated in FIG. 1, placing the device inside of a container having a moveable wall, port, door, hatch, or opening, transmitting data between the sensor and wireless modules and the microcontroller regarding the status of the container and its contents and container walls, the location of the device, cellular, WLAN, and PAN connectivity of the device, and other information. Analysis of the data by the microcontroller, using custom algorithms to determine thresholds and if the data falls outside of pre-determined thresholds, wirelessly sending the data from the microcontroller to the end-user/could, informing the end-user whether changes have been detected to the status of the container and its contents, the connectivities of the device, and/or the location of the device. This step is optional and can be omitted depending on whether an end-user wishes this step to be included in the process or omitted.

Step 612 comprises sending emergency alert to end-user if pre-determined thresholds are exceeded or there is tampering. This can be accomplished by utilizing a device having sensor modules and wireless modules, such as monitoring and advanced asset recovery device 10 and the sensor modules 20 and wireless modules 22 illustrated in FIG. 1, placing the device inside of a container having a moveable wall, port, door, hatch, or opening, transmitting data between the sensors, wireless modules, and the microcontroller regarding the status of the container, container walls, location of the device, cellular, WLAN, and PAN connectivity of the device, and other information. Comparing of the data by the microcontroller to pre-determined thresholds and if the data is above the thresholds, wirelessly sending an emergency alert to the end-user informing them that significant changes have been detected to the status of the container and its contents, the connectivities of the device, and/or the location of the device. This step is optional and can be omitted depending on whether an end-user wishes this step to be included in the process or omitted.

Step 614 comprises sending emergency alert to proper authorities if pre-determined thresholds are exceeded or there is tampering. This can be accomplished by utilizing a device having sensor modules and wireless modules, such as monitoring and advanced asset recovery device 10, the sensor modules 20, and wireless modules 22 illustrated in FIG. 1, placing the device inside of a container having a moveable wall, port, door, hatch, or opening, transmitting data between the sensors, wireless modules, and the microcontroller regarding the status of the container and its contents and container walls, the location of the device, the cellular, WLAN, and PAN connectivity of the device, and other information. Analysis of the data by the microcontroller using a custom algorithm to determine if the data exceeds the defined thresholds, wirelessly sending an emergency alert to proper authorities informing them of the status of the container and the location of the device. This step is optional and can be configured by the end-user.

Communication Redundancies

With reference to FIGS. 6-9, and in various embodiments, a device 700 may be configured to prevent tampering thereof as well as provide redundant channels of communication.

In an embodiment, device 700 and one or more antennas 705 are designed to be fixed to the inside of container 710. This configuration may be provided to protect device 700 and antennas 705 from tampering. For thick or conductive containers 710 that would otherwise block or significantly attenuate electro-magnetic signals, even at lower frequencies, device 705 is capable of connecting to an external flex or patch antenna 705, which can be fixed or adhered in the gap 715 or seam 715 between the container and container door. This antenna type is very thin and small enough that it can be mounted along the seam or gap between the container 710 and container door 720 without any physical interference with door 720, container 710, or a sealing/weather strip. This allows device 700 and antenna 705 to remain recessed in container 710 and protected from tampering, while allowing electro-magnetic transmission and receiving between the inside of container 720 and any external communication devices.

Device 700 may be configured with multiple layers of communication redundancies so as to ensure that device 700 may maintain communication with an external device. This external device communication may be configured to provide location, sensor, and status information regardless of location, condition, or an available network or networks. The primary communication method is via WiFi, where and when WiFi is available. This allows battery power usage to remain low. Should the device become disconnected from the WiFi network, device 700 may be configured to automatically switch to cellular communication. Should cellular and WiFi communication be unavailable, device 700 may be configured to communicate via LoRa/LoRaWAN or satellite.

The range of electro-magnetic signals are dependent on a number of factors, including the frequency of the signal. The higher the frequency the shorter the range for a given signal strength, and vice versa. The ability for a signal to transmit through an enclosure also follows this trend. To allow sufficient signal strength for the device to transmit and receive data signals through a wide range of enclosure materials, thicknesses, and distances, the device uses a wide-band antenna 705 with a configurable transceiver module, allowing device 700 to switch between operating frequency bands and communication protocols to provide strong reliable communication through a wide range of enclosure types and operating conditions.

Example methods of using monitoring and advanced asset recovery device have been described. While the methods have been described as a series of acts, it is to be understood and appreciated that the methods are not limited by the order of acts described, as some acts may in accordance with these methods, be omitted, be repeated, or occur in different orders and/or concurrently with other acts described herein. The methods include methods of using a monitoring and advanced asset recovery device. While some steps, optional steps, and/or alternative steps are exemplified by performing the methods on a container, such as a gun safe, the methods, steps, optional steps, and/or alternative steps described herein can also be used to perform one or more of the steps described herein on any other suitable container, or to complete any other activity.

Those with ordinary skill in the art will appreciate that various modifications and alternatives for the described and illustrated embodiments can be developed in light of the overall teachings of the disclosure. Accordingly, the particular arrangements disclosed are intended to be illustrative only and not limiting to the scope of the invention, which is to be given the full breadth of the appended claims and any and all equivalents thereof.

What is claimed is:

1. A monitoring and advanced asset recovery device comprising:
- a housing;
- a circuit board attached to the housing;
- a computer, electronic components to support the computer, sensor modules, wireless modules, and an antenna in operable connection to the circuit board; and
- an antenna mount configurable to position the antenna at a location operable to emit a signal from a container, with the location configured to allow the antenna to emit the signal without causing the signal to pass through a wall of the container, and with the container providing a tamper resistant configuration for the antenna and the housing disposed therein, wherein the housing is configured for installation inside the container to measure and monitor a number of variables to determine the status and location of the container.

2. The device of claim 1, wherein the antenna mount is a patch positionable in a gap between a door and the wall of the container.

3. The device of claim 2, wherein the antenna broadcasts the signal without passing through the wall of the container and is disposed at a distance within the gap to prevent tampering from outside of the container when the door of the container is in a closed position.

4. A method of monitoring and advanced asset recovery of a container and its contents, the method comprising:
- obtaining a monitoring and advanced asset recovery device comprising:
  - a housing;
  - a circuit board attached to the housing;
  - a computer, electronic components to support the computer, sensor modules, wireless modules, and an antenna in operable connection to the circuit board; and
  - an antenna mount configurable to position the antenna at a location operable to emit a signal from a container, with the location configured to allow the antenna to emit the signal without causing the signal to pass through a wall of the container, and with the container providing a tamper resistant configuration for the antenna and the housing disposed therein, wherein the housing is configured for installation inside the container to measure and monitor a number of variables to determine the status and location of the container;
- installing the monitoring and advanced asset recovery device inside the container;
- monitoring status and location of the container;
- determining if a change in status and location of the container has been detected; and
- alerting at least one of an end-user and a law-enforcement authority if the change in status and location of the container has been detected.

5. The method of claim 4, wherein the step of installing includes positioning the antenna mount as a patch in a gap between a door and the wall of the container.

6. The method of claim 5, wherein the step of alerting includes broadcasting the signal with the antenna without passing through the wall of the container while the antenna is disposed at a distance within the gap to prevent tampering from outside of the container when the door of the container is in a closed position.

7. The method of claim 4, further comprising determining at least one of temperature and humidity of the inside of the container.

8. The method of claim 4, further comprising determining a location of the monitoring and advanced asset recovery device.

9. The method of claim 4, further comprising determining at least one of an opening of, and closing of, a door of the container.

10. The method of claim 4, wherein the step of determining if the change in status and location of the container has been detected further comprises determining a change in magnetic field in the container.

11. The method of claim 4, further comprising determining availability of WiFi connectivity.

12. The method of claim 11, further comprising determining availability of cellular connectivity when WiFi is unavailable and transmitting using cellular data.

13. The method of claim 11, further comprising determining availability of cellular connectivity when WiFi is unavailable and transmitting using PAN connectivity.

14. The method of claim 11, further comprising determining availability of WLAN when WiFi is unavailable and transmitting using WLAN connectivity.

15. The method of claim 11, further comprising determining availability of GNSS connectivity when WiFi is unavailable and transmitting using GNSS connectivity.

16. The method of claim 4, further comprising transmitting information about the monitoring and advanced asset recovery device, the container, the container door, the wireless modules, and other data to an outside device.

17. The method of claim 4, further comprising:

determining if any of the data transmitted meets a pre-determined threshold;

sending emergency signal to an end-user via wireless modules that includes location data and status information of the inside of the container when the data transmitted meets the pre-determined threshold; and sending emergency signal to a law-enforcement authority via wireless modules that includes location data and status information of the inside of the container when the data transmitted meets the pre-determined threshold.

18. The method of claim 4, further comprising:

monitoring the location of the device; and transmitting data regarding the status of the container and location of the device to the end-user.

19. The method of claim 4, further comprising sending emergency alert to the end-user if pre-determined thresholds are exceeded.

20. The method of claim 4, further comprising sending emergency alert to a law-enforcement authority if pre-determined thresholds are exceeded.

* * * * *